No. 728,291. PATENTED MAY 19, 1903.
M. S. QUIGGLE.
COW OR CALF WEANER.
APPLICATION FILED NOV. 5, 1902.
NO MODEL.

Witnesses.

Inventor
Michael S. Quiggle,
by Paul & Paul,
his attorneys.

No. 728,291. Patented May 19, 1903.

UNITED STATES PATENT OFFICE.

MICHAEL S. QUIGGLE, OF OWATONNA, MINNESOTA.

COW OR CALF WEANER.

SPECIFICATION forming part of Letters Patent No. 728,291, dated May 19, 1903.

Application filed November 5, 1902. Serial No. 130,144. (No model.)

*To all whom it may concern:*

Be it known that I, MICHAEL S. QUIGGLE, of Owatonna, Steele county, Minnesota, have invented certain new and useful Improvements in Cow or Calf Weaners, of which the following is a specification.

My invention relates to weaners; and the object of the invention is to provide a device to be attached to the head of the animal to prevent a calf from sucking a cow or a cow from sucking herself or another cow.

The invention consists generally in the various constructions and combinations, all as hereinafter described, and particularly pointed out in the claims.

Figure 1:
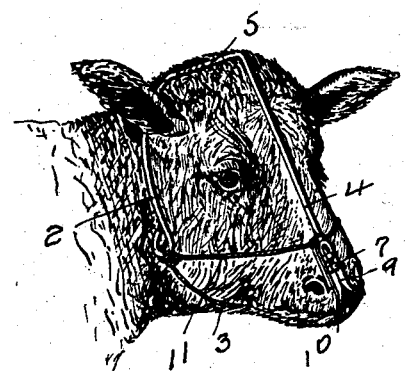
Figure 2:
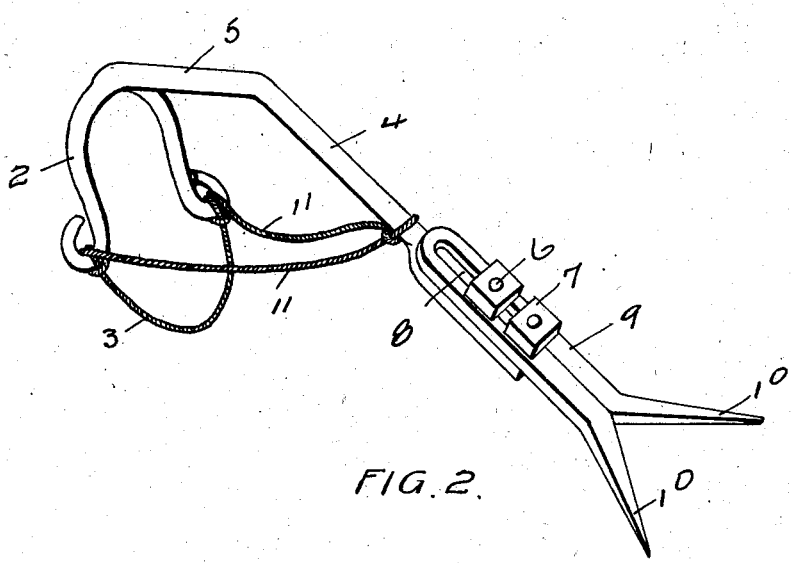

In the accompanying drawings, forming part of this specification, Figure 1 is a view of the head of a calf with my invention applied thereto. Fig. 2 is a perspective view of the device.

In the drawings, 2 represents a yoke that is designed to slip down over the neck of the animal just back of the ears and having its ends connected, if preferred, by a rope 3, which passes under the neck and prevents the device from slipping off the head of the animal.

4 is a shank that extends down over the head between the eyes and is provided with a section 5, that extends back over the top of the head and to which the yoke 2 is secured, these parts being all preferably integral and made of flat or round iron, as preferred. At the lower end of the shank 4 I provide bolts 6, having nuts 7 and passing through a slot 8 in a fork 9, that is provided at its lower end with the spreading points 10. These points are so arranged that their ends will be substantially flush with the end of the nose and will not in any way interfere with the feeding of the animal; but in case the calf attempts to suck the points will prick the cow, and if the device is fastened on a cow she will not suck herself or another cow. The fork, being adjustable, permits the device to be fitted to animals of different size, it being essential that the points of the fork be placed in the position substantially as shown in the figure, so that they will not interfere with the animal except when sucking. To prevent the fork from slipping to one side or the other on the nose of the animal, I prefer to provide a cord 11, secured to the ends of the yoke and extending around on each side of the nose and fastened to the shank 4. The points are at such an angle on the nose of the animal that they cannot tear the flesh or in any way seriously injure the cow, but will prick her sufficiently so that she will not stand and allow a calf or another cow to suck her.

The device fits snugly on the head of the animal, and there are no projecting parts to catch on bushes or limbs of trees, and the attachment will not cause any inconvenience in eating or drinking.

The device can be made of any suitable size and strength, according to the animal upon which it is to be placed.

I claim as my invention—

1. A cow and calf weaner comprising a yoke adapted to slip down over the neck of the animal, a shank projecting forward from said yoke and extending down over the head, a fork secured to said shank and having spreading points whose ends are flush substantially with the nose of the animal, and suitable straps or cords for securing said yoke and shank in place.

2. A cow and calf weaner comprising a yoke adapted to straddle the neck of the animal back of the ears, a shank projecting forward from said yoke and extending down over the head, a fork adjustably secured to said shank substantially in line therewith and having points, and suitable means for securing said shank and yoke in place.

3. A cow and calf weaner comprising a yoke 2, a shank composed of sections 4 and 5 projecting forward from said yoke and down over the head between the eyes of the animal, bolts provided near the lower end of said section 4, a shank 9 having a slot 8 to receive said bolts and whereon said shank is adjustable, and spreading points 10 provided on said shank 9, for the purpose specified.

4. A cow and calf weaner, comprising a shank secured to the neck of the animal and having a forwardly-projecting portion that extends down over the head and a fork having an adjustable connection with said shank, and points that are flush substantially with the nose of the animal.

5. A cow and calf weaner, comprising a shank having means for attachment to the neck of the animal and a forwardly-projecting portion to rest upon the head between the eyes, and an extension provided on the lower end of said shank having an adjustable connection therewith, and a pointed end.

6. A cow and calf weaner, comprising a U-shaped yoke adapted to straddle the neck of the animal back of the ears, a shank extending forwardly from said yoke and arranged to rest upon the head between the eyes, means for securing said shank and yoke to the head, and a pointed part provided at the lower end of said shank.

In witness whereof I have hereunto set my hand this 11th day of September, 1902.

MICHAEL S. QUIGGLE.

In presence of—
RICHARD PAUL,
M. C. NOONAN.